United States Patent [19]

Savey et al.

[11] 4,256,803
[45] Mar. 17, 1981

[54] PANEL BASED ON POLYCONDENSABLE RESIN AND A METHOD FOR THE MANUFACTURE OF THIS PANEL

[75] Inventors: Claude Savey; Florent Laurent, both of Bersee, France

[73] Assignee: Societe Anonyme dite Stratiforme, Nord, France

[21] Appl. No.: 2,733

[22] Filed: Jan. 11, 1979

[51] Int. Cl.³ .................. B32B 5/20; B32B 17/04; B32B 23/18; B29D 27/04
[52] U.S. Cl. .................. 428/315; 264/45.3; 264/46.6; 264/101; 264/DIG. 2; 264/DIG. 6; 264/DIG. 7; 428/71; 428/313; 428/406; 521/54; 521/181
[58] Field of Search .............. 264/46.4, 46.5, DIG. 2, 264/45.3, 46.6, DIG. 6, DIG. 7, 53, DIG. 13, 101; 428/71, 313, 406, 407, 315; 521/54, 181

[56] References Cited

U.S. PATENT DOCUMENTS

| 2,376,653 | 5/1945 | Boyer | 264/46.5 X |
| 2,582,228 | 1/1952 | Brinkema | 264/46.5 X |
| 3,557,263 | 1/1971 | Marra | 264/45.3 |
| 4,130,614 | 12/1978 | Saidla | 264/46.5 X |

Primary Examiner—Philip Anderson
Attorney, Agent, or Firm—Robert E. Burns; Emmanuel J. Lobato; Bruce L. Adams

[57] ABSTRACT

A panel comprising fillers embedded in a closed cell expanded phenolic resin is made by making a mixture, which is initially fluid, or phenolic resin, a hardening agent, a surface active agent and a porogenic agent, which has a boiling point above ambient temperature and below the polycondensation temperature of the mixture. This liquid mixture is mixed with fillers, for example balls or microspheres of glass or expanded material such as polystyrene. The resulting mixture is placed in a mould, only partially filling the mould, and heated progressively to a temperature in the neighborhood of the boiling point of the porogene agent, while evacuating the mould, and held at that temperature until the mixture has expanded to fill the mould. The temperature is then progressively increased to the polycondensation temperature to harden the expanded mixture.

14 Claims, 4 Drawing Figures

PANEL BASED ON POLYCONDENSABLE RESIN AND A METHOD FOR THE MANUFACTURE OF THIS PANEL

FIELD OF INVENTION

The present invention relates to a panel based on polycondensable resin and a method for the manufacture of this panel.

The invention relates more particularly to the manufacture of panels from a phenolic resin comprising a filler such as balls of expanded polystyrene, or expanded clay, or microspheres of glass, or a similar material.

BACKGROUND OF THE INVENTION

These panels, obtained by mixing the filler with a liquid mixture comprising the phenolic resin, and an agent for hardening this resin, have a certain number of drawbacks in their present method of manufacture, due to their structure and to the fact that their manufacture is inadequately controlled.

One of these drawbacks resides in that under the conditions in which the manufacture is presently carried out, for obtaining a phenolic resin with open cells, on the one hand the latter is subject to infiltrations in particular of water and on the other hand, burns easily owing to the presence of air which is trapped therein. In addition, this resin having open cells lacks cohesion.

It is possible to minimise these drawbacks by placing the panel obtained between facings of a suitable type, for example steel facings, but it is only possible to envisage facings defining a casing around the panel, which casing has its own cohesion owing to the lack of cohesion of the panel itself. In particular, it is not possible to produce facings in the form of a layer of polymerisable resin integral with the panel over the entire surface area. The constraint limits the currently known use of panels based on phenolic resin.

Another drawback of these panels resides in their lack of homogeneity, fillers having a density less than the density of the resin tending to rise when the resin has not been completely polycondensed and in particular at the time of an expansion phase, whereas the denser resin tends to drop. A cut made in a panel produced in the currently known manner reveals a much greater density of filler in the upper part of the panel than in its lower part, the result being great friarbility of the panel in its upper part. It is also apparent that the resin expands in a heterogeneous manner, expanding much more freely towards the top of the panel than at the bottom, which detracts further from the mechanical properties of the panel in its upper part.

Furthermore, difficulties are encountered in working industrially with polystyrene balls and phenolic resins with their currently known composition, owing to their short shelf life, i.e. the short period of time during which they can be used after preparation, which considerably limits the quantity of resin which can be prepared and consequently used for a manufacture.

DESCRIPTION OF THE INVENTION

The present invention makes it possible to remedy all these drawbacks, both by a wise choice of the composition of the polycondensable mixture used and owing to control of the conditions, in particular evolution of temperature during the manufacture.

By dissociating the expansion of the mixture and its polycondensation, i.e. its hardening, the invention makes it possible to cause a maximum expansion before the hardening, i.e. to ensure complete filling of the mould in which the manufacture takes place, before hardening of the mixture, which results in obtaining closed cells and an outer skin which is impermeable and has a homogeneous appearance. If there has previously been placed against the inner sides of/this enclosure, a particularly polycondensable material based on phenolic resin, possibly reinforced in order to constitute a facing layer after polycondensation, this possibility of maximum expansion in a limited enclosure also makes it possible to obtain good interpenetration of the facing layer and of the core of expanded phenolic resin in their adjacent areas, which results in good attachment of the facing layer to the core of phenolic foam, which also has good cohesion owing to the closed cell structure.

This dissociation of the expansion phase and of the hardening phase is obtained by a wise choice of the pore forming agent (hereinafter also referred to as a porogenic agent) in order that its boiling point is lower than the polycondensation temperature of the mixture, but much higher than the ambient temperature, in order to prevent the beginning of an emulsion during mixing, which on the one hand would reduce the shelf life of the mixture and on the other hand would limit the facility for subsequent expansion of the mixture. The method of heating the mould after the introduction of the polycondensable mixture and of the fillers will be adapted according to the invention in order to effectively achieve dissociation of the expansion phase of the resin and of the polycondensation phase in order to control the reaction and obtain a homogeneous material. When the balls have been coated with the necessary quantity of resin, an expansion of the resin is caused in the region of each ball, which expansion manifests itself in the mould by pushing forces in all directions and in the region of each ball. According to the invention, heating is in fact carried out such that the temperature rises progressively to a temperature close to the boiling point of the porogenic agent, then this temperature is then kept virtually constant for a sufficient period of time to bring about maximum expansion of the mixture, under high steam pressure of the porogenic agent. The temperature is then increased once more progressively to the polycondensation temperature, in order to bring about this polycondensation when the expansion is maximum, in view of the limited volume of the mould in which it is carried out. This rise in temperature, from the temperature of the expansion phase, i.e. the temperature close to the boiling point of the porogenic agent up to the polycondensation temperature, will take place progressively in a preferred embodiment, in order to eliminate the water vapour and formaldehyde vapour more completely under the joint action of the vacuum. This progressive and therefore more complete elimination will make it possible to obtain an improved surface appearance in the case where one manufactures a panel comprising an outer coating layer also of phenolic resin which is possibly reinforced.

The composition of the polycondensable mixture is also chosen in order to ensure homogeneous coating of the filler, i.e. to fix a maximum quantity of mixture on this filler, in a homogeneous manner, in order to cause the maximum expansion, then polycondensation in the manner afore-described.

To this end, the proportion of surface active agents in the mixture is increased in order to provide better adhesion of the resin to the balls. The proportion of hardening agents will be reduced in order to decrease the effects of starting of the polycondensation phase, which could occur simultaneously with the expansion phase and this would be at the chosen temperature of the stage. The essential purpose of these modifications in the proportions of the mixture with respect to the proportions used in known manner is to give the viscosity of this mixture before expansion and to maintain this viscosity during expansion, at a value which is sufficiently high in order that the adhesion to the fillers is sufficient and sufficiently moderate to prevent the agglomeration of an excessive quantity of mixture around the fillers resulting in inadequate expansion for reasons of weight. As a non-limiting example, good results have been obtained by giving the quantity of hardeners in the polycondensable mixture a value of the order of 5% as against a value of 10 to 15% in the case of currently known compositions which produce phenolic resin having closed cells, and of increasing the proportion of surface active agents to approximately 2%, which is of the order of 1% in known compositions, the proportion of porogenic agents normally of the order of 5 to 15% being raised to 20% in order to increase the expansion capacity of the mixture, these percentages being understood in terms of weight per unit of weight of phenolic resin.

The method according to the invention is consequently characterized in that the fillers are mixed with a fluid mixture comprising at least one phenolic resin, one hardening agent, one surface active agent and one porogenic agent chosen such that it has a boiling point comprised between the ambient temperature during mixing and the polycondensation temperature of the mixture. After having placed all the substances in the inner space of a closed mould, in a quantity such that there is a space inside the latter allowing a subsequent expansion of the mixture, another characteristic of the method is that the temperature of the mixture is raised progressively to a temperature close to the boiling point of the porogenic agent, then the temperature is kept substantially constant for a sufficient period of time in order to bring about maximum expansion of the mixture, then the temperature of the mixture is once more raised progressively in order to cause polycondensation of the mixture expanded to the maximum extent.

According to another feature of the method according to the invention, the composition of the mixture is such that it is in the state of a gel up to said temperature close to the boiling point of the porogenic agent and less than the latter, in order to give this mixture a viscosity such that there is a maximum quantity around the fillers before and during expansion.

The panel according to the invention, comprising a phenolic resin coating the fillers is in turn characterised in that the phenolic resin is an expanded phenolic resin having a system of closed cells.

DESCRIPTION OF DRAWING

The invention will be better understood on referring to the ensuing description relating to a non-limiting embodiment, as well as to the accompanying drawings which form an integral part of this description.

DESCRIPTION OF PREFERRED EMBODIMENTS

Figure 1:
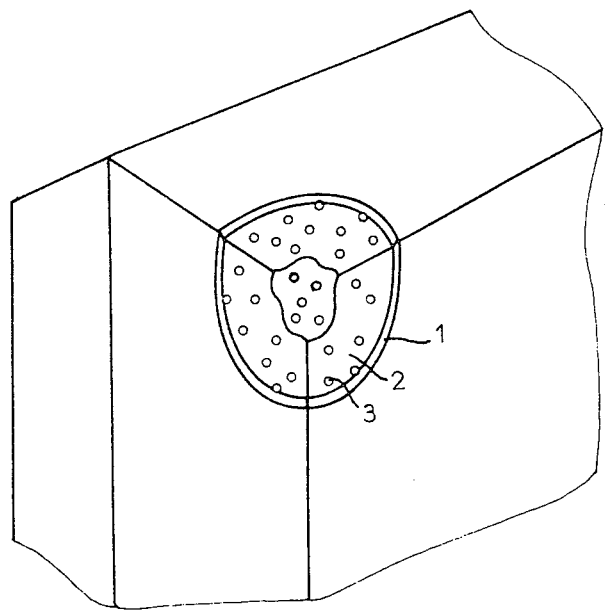
FIG. 1 is a perspective view, with parts cut away, of a panel according to the invention.
Figure 2:
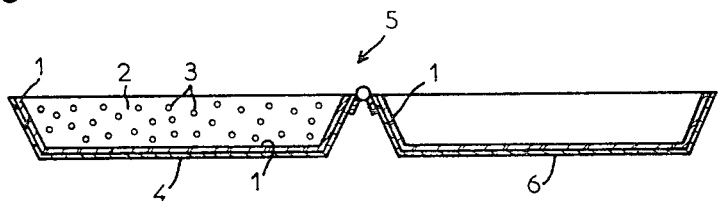
FIGS. 2 to 4 illustrate three successive stages of the manufacture of this panel in a mould, in section through a vertical plane at right-angles to the general horizontal plane of the mould.
Figure 3:
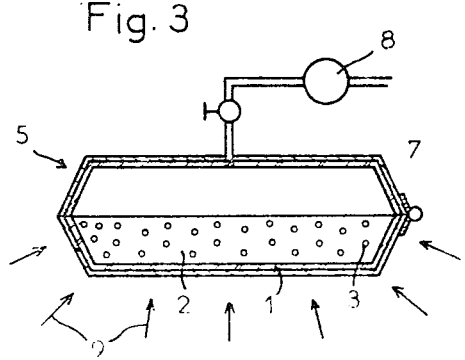

The same reference numerals have been used in these four figures to designate the various constituents of the finished panel (FIGS. 1 and 4) and these various constituents as they exist during the various stages of manufacture of the panel (FIGS. 2 and 3).

In its embodiment illustrated in FIG. 1, the panel according to the invention has an outer covering layer 1 of polycondensed phenolic resin, preferably reinforced for example with a glass fibre fabric or other similar reinforcements, integral with the entire surface area of the core produced from an expanded phenolic resin 2 having closed cells, coating the fillers as for example balls or microspheres of glass or an expanded material such as expanded polystyrene, expanded clay etc.

The fillers 3 are coated in the resin 2 including the side of the core in contact with the covering layer 1, where the resin 2 forms an impermeable skin.

The panel according to the invention could also be devoid of the covering layer 1, this impermeable skin ensuring its water-tightness and mechanical surface resistance, also providing a homogeneous appearance when the panel is produced according to the invention.

Figure 4:
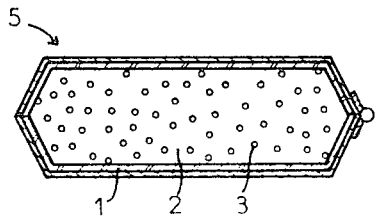

To produce such a panel, the fillers 3 are mixed with the mixture intended to form the resin 2 after expansion and polycondensation, which mixture is also designated by the reference numeral 2 in FIGS. 2 to 4.

The mixture, which is initially fluid, comprises at least one phenolic resin, a hardening agent, a surface active agent and a porogenic agent.

As a non-limiting example, good results have been obtained by using a mixture comprising 5% hardening agent constituted by sulphuric acid to which alcohol and water have been added, 2% of a surface active agent constituted by silicone oil and 20% of a porogenic agent constituted by a trichlorotrifluoroethane, these proportions being given in terms of mass per unit of weight of phenolic resin in the mixture.

The trichlorotrifluoroethane has a boiling point of approximately 47° C., which is an intermediate temperature between the ambient temperature at the time of mixing and the polycondensation temperature of the mixture, which is of the order of 60° C. at 0.6 atmospheres, this choice being according to one of the aims of the invention, which is to allow maximum expansion before polycondensation by controlling the rise in temperature of the mixture when it is placed in the mould.

After mixing with the fillers in order to provide the best distribution of the latter, the mixture is placed in one of the halves 4 of a mould 5, if necessary after the inner sides of this half 4 and of the other half 6 of the mould have been coated with a layer of phenolic resin which preferably contains a reinforcing material such as a layer of glass fibres, if one wishes to obtain a panel having an outer phenolic covering layer 1 of the same type as the core. This stage of the manufacture of a panel is illustrated in FIG. 2.

Preferably, the layer of phenolic resin 1 possibly comprising a reinforcement, is in the state of a prepolymerised gel when the mixture 2-3 is introduced into the half 4 of the mould 5.

The mould 5 is then sealed hermetically by folding the half 6 over on to the half 4, then the space 7 remaining free above the mixture 2-3 inside the mould 5 closed in this way owing to the fact that only the half 4 was initially filled with mixture 2-3, is connected to a vacuum pump 8 which establishes a vacuum at least during heating, shown diagrammatically by the arrows 9 in FIG. 3, before and during the polycondensation following this heating. The reduced pressure may remain slight during the stage of the rise in temperature and the expansion stage, but will be increased during the polycondensation stage in order to eliminate any vapours.

According to the invention, this heating takes place in three stages the first of which, lasting for 30 minutes for example, progressively increases the temperature of the mould and its contents from the ambient temperature to a temperature of the order of 40° C. for example, i.e. a temperature close to the boiling point of the porogenic agent used. The temperature is then maintained at this value, for example of 40° C., for 30 minutes for example, during which stage the mixture expands under the high pressure of vapours coming from the porogenic product. At the end of this expansion stage, the temperature is then increased progressively from 40° C. to 60° C., at which point polycondensation occurs, the latter heating lasting for approximately 120 minutes for example.

A polycondensation temperature of the order of 60° C. makes it possible to use expanded polystyrene balls as fillers 3, which should not be heated to a temperature higher than 80° C.

Heating carried out under these conditions for the composition given above make it possible to obtain maximum expansion before hardening, the entire inner space of the mould 5 being filled by the expanded material applied under pressure against the surface covering 1, itself applied against the wall of the mould at the end of the expansion stage and before hardening as shown diagrammatically in FIG. 4. Furthermore, a homogeneous distribution of the filler 3 inside the panel is obtained.

Naturally, the composition given above and the operating conditions, linked with this composition, have been given solely by way of example and numerous variations could be made without diverging from the scope of the invention.

The mixture obtained with the afore-mentioned composition has a shelf life sufficient for carrying out manufacturing operations using a large quantity of mixture, this mixture being able to be used for up to one or two days.

What is claimed is:

1. A process of making a panel which comprises:
   forming a fluid mixture of phenolic resin, a hardening agent, a surface active agent and a volatile liquid pore forming agent having a boiling point above ambient temperature during mixing and below the polycondensation temperature of said mixture,
   uniformly mixing said mixture with solid fillers in particulate form,
   partially filling a mould with said fluid mixture with said fillers therein and closing said mould,
   progressively raising the temperature of said mixture to a temperature in the vicinity of the boiling point of said pore forming agent and maintaining said mixture at said temperature to produce expansion of said mixture to fill said mould, and
   thereafter progressively raising the temperature of said mixture to the polycondensation temperature of said mixture to effect polycondensation of said mixture.

2. A process according to claim 1, in which said mould is evacuated during heating before and during polycondensation of said mixture.

3. A process according to claim 1, in which said mixture is in the state of a gel up to said temperature to produce expansion of said mixture in order to give the mixture a viscosity to assure a maximum quantity of said mixture around said fillers before and during expansion.

4. A process according to claim 1, in which the walls of said mould are covered with a layer of phenolic resin prior to the introduction of said fillers and mixture into said mould.

5. A process according to claim 4, in which said layer of phenolic resin is in gel form prior to the introduction of said fillers and mixture into said mould.

6. A process according to claim 4 or 5 in which said layer of phenolic resin is reinforced with fiberglass fabric.

7. A process according to claim 1, in which said pore forming agent is a trichlorotrifluroethane having a boiling point of about 47° C.

8. A process according to claim 7, in which said mixture has a polycondensation temperature of about 60° C.

9. A process according to claim 1, in which the quantity of hardening agent in said mixture is about 5% of the quantity of phenolic resin.

10. A process according to claim 1, in which the quantity of surface active agent in said mixture is at least 2% of the quantity of phenolic resin.

11. A process according to claim 1, in which the quantity of said pore forming agent in said mixture is at least about 20% of the quantity of phenolic resin.

12. A process according to claim 1, in which said fillers comprise small balls of glass, expanded polytyrene or expanded clay.

13. A panel made by the process of claim 1.

14. A panel made by the process of claim 4.